US009250261B2

(12) United States Patent
Lin et al.

(10) Patent No.: US 9,250,261 B2
(45) Date of Patent: Feb. 2, 2016

(54) METHOD, APPARATUS AND SYSTEM FOR PROVIDING METERING OF ACCELERATION

(71) Applicants: Kevin L. Lin, Chandler, AZ (US); Feras Eid, Chandler, AZ (US); Qing Ma, Saratoga, CA (US)

(72) Inventors: Kevin L. Lin, Chandler, AZ (US); Feras Eid, Chandler, AZ (US); Qing Ma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 13/730,634

(22) Filed: Dec. 28, 2012

(65) Prior Publication Data

US 2014/0182377 A1 Jul. 3, 2014

(51) Int. Cl.
*G01P 15/105* (2006.01)
*G01P 15/08* (2006.01)

(52) U.S. Cl.
CPC ............... *G01P 15/105* (2013.01); *G01P 15/08* (2013.01)

(58) Field of Classification Search
CPC ....... G01P 15/11; G01P 15/105; G01P 15/18; G01P 15/08; G01P 1/023; G01P 15/097; G01P 15/0802
USPC .............................. 73/513.31, 514.29, 514.16
See application file for complete search history.

(56) References Cited

U.S. PATENT DOCUMENTS

| 4,498,341 | A | * | 2/1985 | Breitbach et al. ......... 73/514.31 |
| 4,967,598 | A | * | 11/1990 | Wakatsuki et al. ........ 73/514.12 |
| 5,442,288 | A | * | 8/1995 | Fenn et al. ..................... 324/244 |
| 5,488,862 | A | * | 2/1996 | Neukermans et al. ..... 73/504.02 |
| 5,693,883 | A | * | 12/1997 | Giroud et al. .............. 73/514.24 |
| 5,763,783 | A | * | 6/1998 | Asada ......................... 73/514.31 |
| 6,044,705 | A | * | 4/2000 | Neukermans et al. ..... 73/504.02 |
| 6,131,457 | A | * | 10/2000 | Sato ............................ 73/514.31 |
| 6,311,557 | B1 | * | 11/2001 | Davis et al. ................ 73/514.31 |

(Continued)

FOREIGN PATENT DOCUMENTS

| JP | H05142246 | 6/1993 |
| KR | 1020030094539 | 12/2003 |
| KR | 20070095247 | 9/2007 |
| KR | 20120061880 | 6/2012 |

OTHER PUBLICATIONS

"PCT, International Search Report and Written Opinion of the International Searching Authority for International Application No. PCT/US 2013/046822", (Sep. 26, 2013), Whole Document.

(Continued)

*Primary Examiner* — Helen Kwok
(74) *Attorney, Agent, or Firm* — Blakely, Sokoloff, Taylor & Zafman LLP

(57) ABSTRACT

Techniques and mechanisms to provide for metering acceleration. In an embodiment, a microelectromechanical accelerometer includes a magnet, a mass, and a first support beam portion and second support beam portion for suspension of the mass. Resonance frequency characteristics of the first support beam portion and second support beam portion, based on the magnet and a current conducted by the first support beam portion and second support beam portion, are indicative of acceleration of the mass. In another embodiment, the accelerometer further includes a first wire portion and a second wire portion which are each coupled to the mass and further coupled to a respective anchor for exchanging a signal with the first wire portion and the second wire portion. The first wire portion and the second wire portion provide for biasing of the mass.

25 Claims, 9 Drawing Sheets

(top view)

(side view)

(56) References Cited

U.S. PATENT DOCUMENTS

| | | | |
|---|---|---|---|
| 6,631,643 B2* | 10/2003 | Malvern et al. | 73/514.32 |
| 6,668,627 B2* | 12/2003 | Lange et al. | 73/105 |
| 7,219,549 B2* | 5/2007 | Honkura et al. | 73/514.31 |
| 7,621,185 B2* | 11/2009 | Kasajima | 73/514.31 |
| 7,886,600 B2* | 2/2011 | Honkura et al. | 73/514.31 |
| 2007/0209437 A1* | 9/2007 | Xue et al. | 73/514.31 |
| 2010/0299949 A1 | 12/2010 | Lubgins et al. | |
| 2012/0312097 A1* | 12/2012 | Koyama et al. | 73/514.34 |

OTHER PUBLICATIONS

"International Preliminary Report on Patentability dated Jul. 9, 2015, in International Patent Application No. PCT/US2013/046822, 6 pages".

Office Action for Japanese Patent Application No. 2014-558997, mailed Jul. 30, 2015, 4 pgs.

Office Action for Korean Patent Application No. 10-2014-7018015, mailed Aug. 20, 2015, 3 pgs.

\* cited by examiner

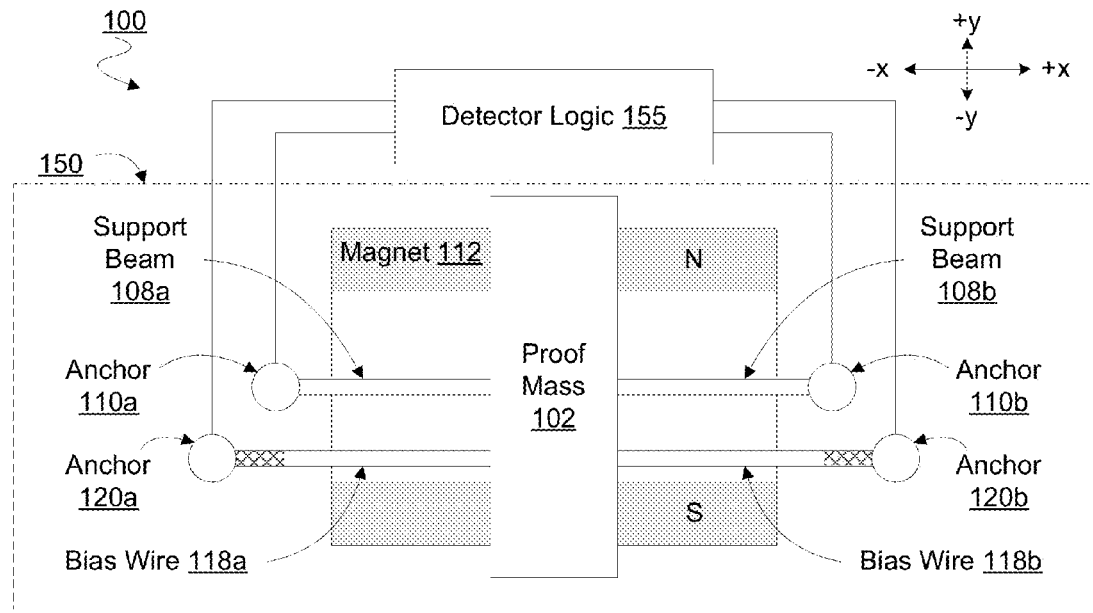
FIG. 1A (top view)
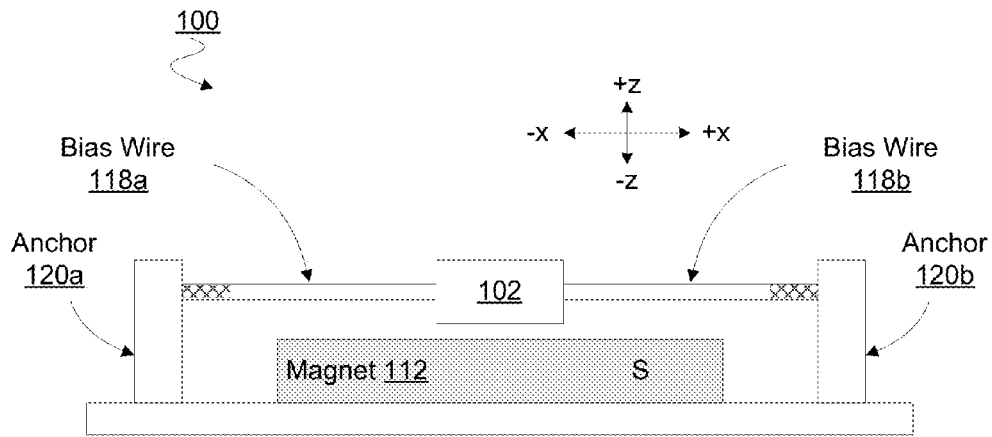
FIG. 1B (side view)

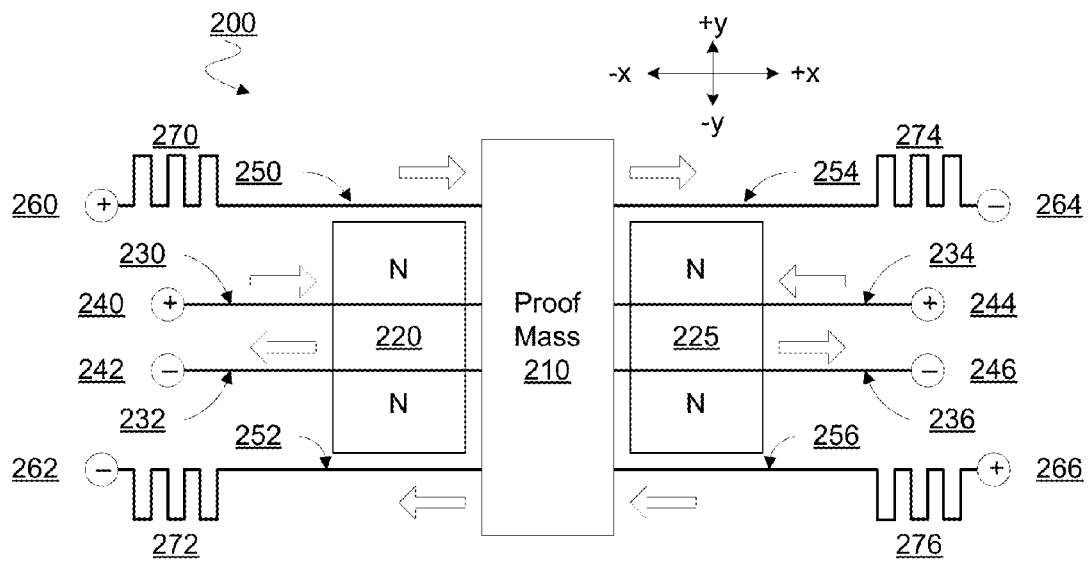
FIG. 2A (top view)
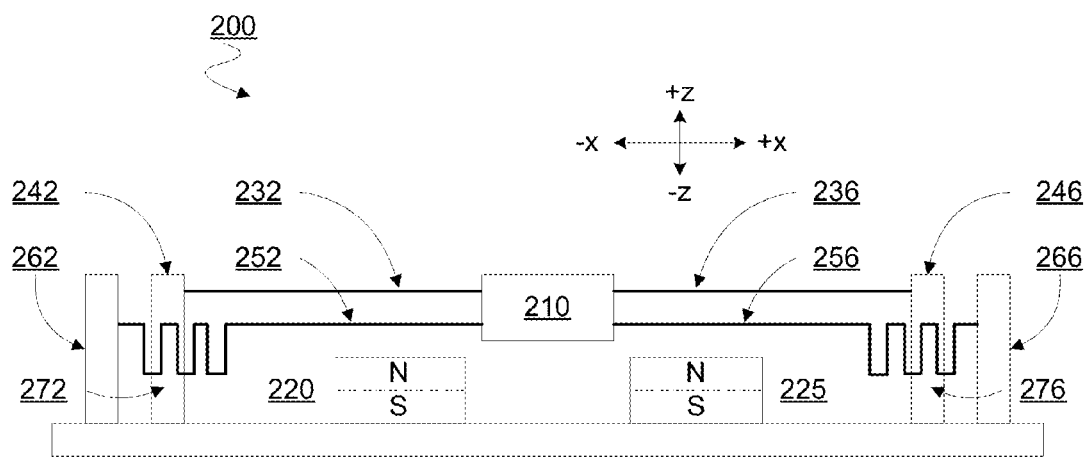
FIG. 2B (side vide)

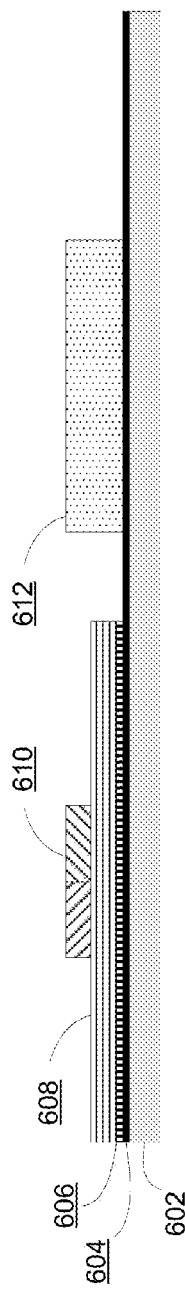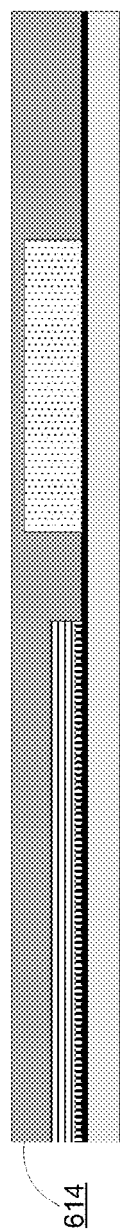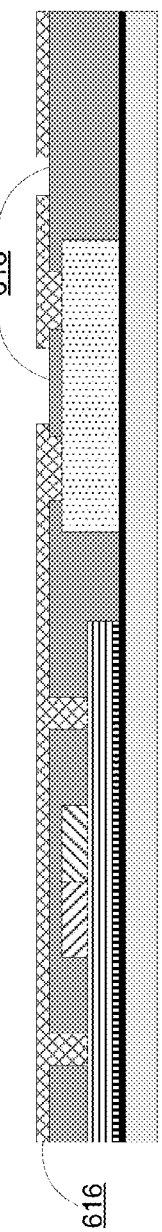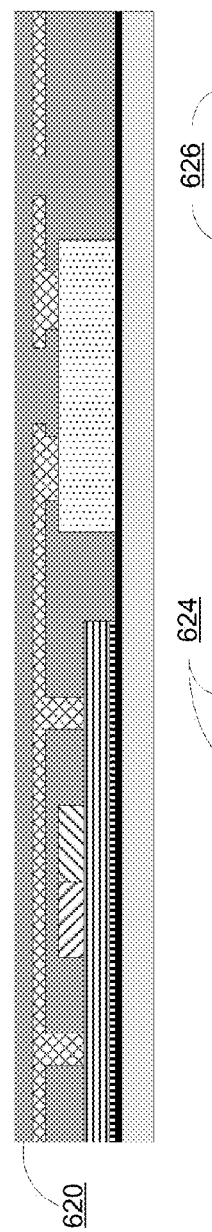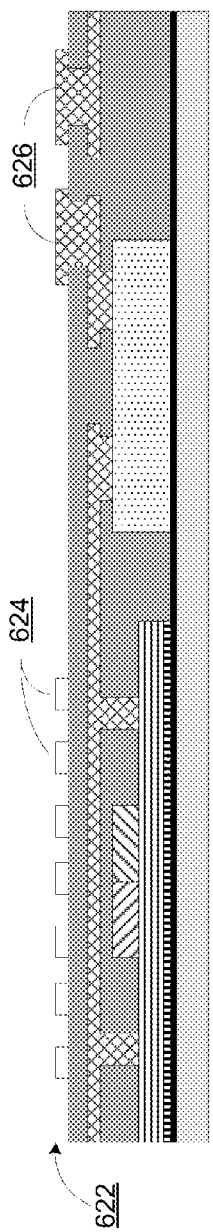

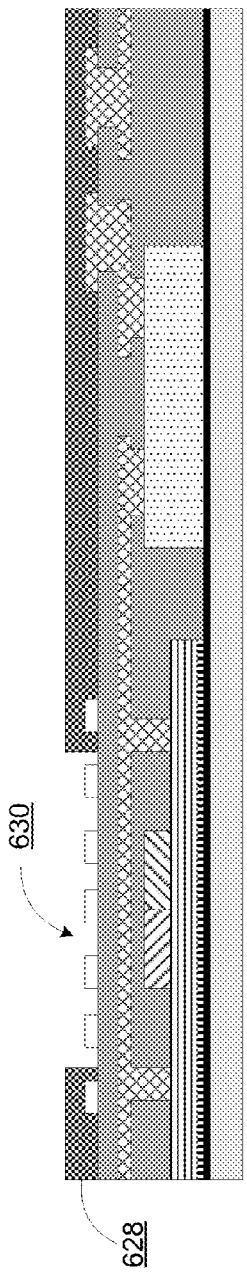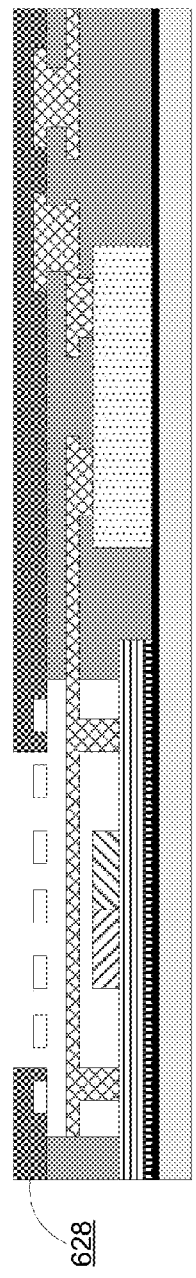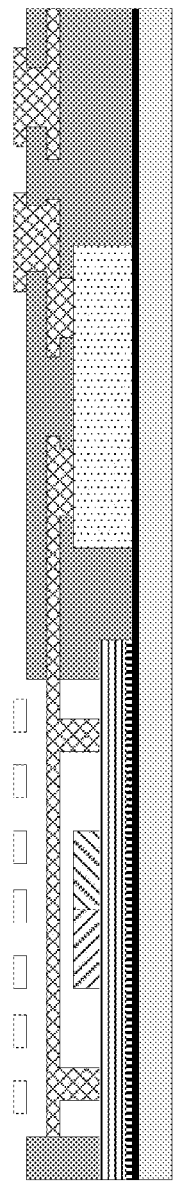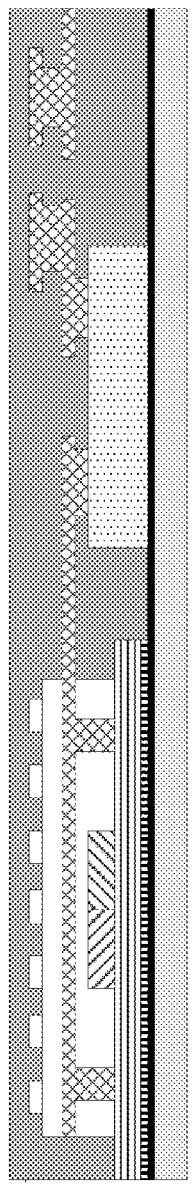

METHOD, APPARATUS AND SYSTEM FOR PROVIDING METERING OF ACCELERATION

BACKGROUND

1. Technical Field

This disclosure relates generally to metrology devices and more particularly to accelerometers.

2. Background Art

Recent advancements in the field of microelectromechanical systems (MEMS) technologies have made it possible to integrate micro-sized electromechanical components, such as microsensors and microactuators, into many electronic devices.

Moreover, handheld electronic devices often employ accelerometers to provide orientation and acceleration information. These handheld electronic devices include, for example, mobile phones, game controllers, handheld computing devices, tablet computers, mobile devices, digital cameras, navigations systems, and the like, that use the orientation and/or acceleration information to improve user interaction as well as provide data to a wide variety of applications, such as health monitoring and context-aware applications.

BRIEF DESCRIPTION OF THE DRAWINGS

The various embodiments of the present invention are illustrated by way of example, and not by way of limitation, in the figures of the accompanying drawings and in which:

FIGS. 1A and 1B are block diagrams each illustrating elements of a system for metering acceleration according to an embodiment.

FIGS. 2A and 2B are block diagrams each illustrating elements of an accelerometer according to an embodiment.

FIGS. 6A through 6I are a block diagrams illustrating elements of a method for fabricating an accelerometer according to an embodiment.

DETAILED DESCRIPTION

Figure 3:
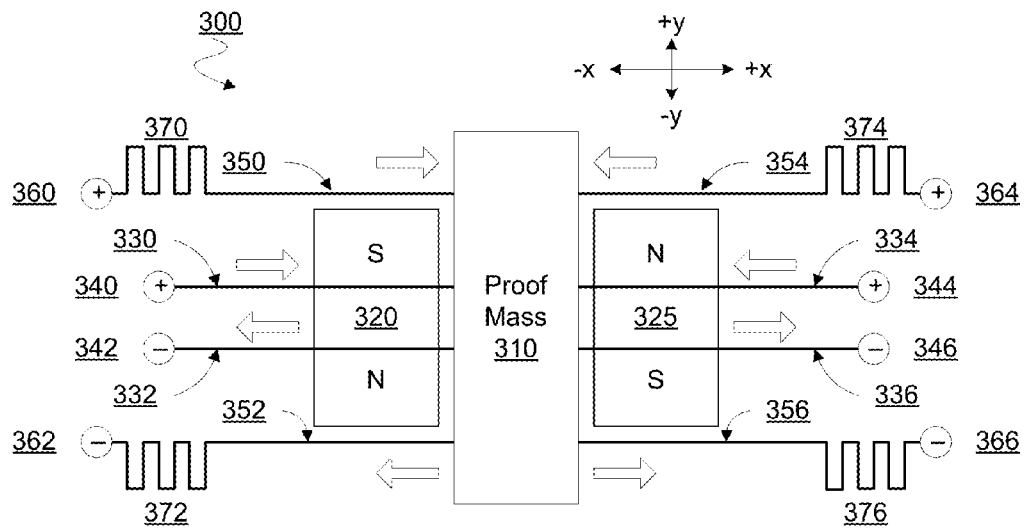
FIG. 3 is a block diagram illustrating elements of an accelerometer according to an embodiment.

In the description that follows, to illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

An accelerometer in accordance with an embodiment includes one or more permanent magnets or electromagnets, a proof mass, suspended by one or more beam structures—also referred to herein variously as "support beam portion" or simply "support beam"—which are each to provide at least in part a respective conductive path. When a time varying signal is applied to such a conductive path, a characteristic resonant frequency is produced. When the proof mass experiences acceleration, a respective change in the resonant frequency is produced. In an embodiment, an accelerometer further includes bias wires for exerting a bias force on the proof mass. Such a bias force may be exploited, for example, to variously contribute to improved accelerometer sensitivity, improved accelerometer calibration and/or to allow for smaller accelerometer geometry.

Turning now to the certain aspects of various embodiments, FIG. 1A is a top view illustrating elements of a system 100 to meter acceleration according to an embodiment. System 100 may include an accelerometer 150 and detector logic 155 to sense operation of accelerometer 155 and, based on such sensed operation, to determine one or more characteristics of an acceleration.

In an embodiment, accelerometer 150 includes one or more magnets—represented by an illustrative permanent magnet 112—a proof mass 102 that acts as the inertial mass, and support structures which suspend proof mass 102 over a layer which includes the one or more magnets. By way of illustration and not limitation, such support structures may include a support beam 108a coupled between proof mass 102 and an anchor 110a of accelerometer 150, and/or a support beam 108b coupled between proof mass 102 and an anchor 110b of accelerometer 150. Accelerometer 150 may include any of a variety of additional or alternative support structures for suspending proof mass 102, according to different embodiments. The arrangement of the magnetic polarity of magnet 112 is merely illustrative, and is not limiting on certain embodiments.

Anchors 110a, 110b, may provide electrical connectivity for support beams 108a, 108b—e.g. in addition to providing mechanical support for suspending proof mass 102. By way of illustration and not limitation, support beams 108a, 108b may provide at least part of a conductive path for an electrical signal—e.g. a time varying signal—to be exchanged between anchors 110a, 110b. In an embodiment, the electrical signal traverses a magnetic field generated by magnet 112 in at least a first direction, such as along the X dimension shown. The electrical signal may further be conducted via proof mass 102, although certain embodiments are not limited in this regard. Due at least in part to the magnetic field, the conductive path will have an associated resonance frequency characteristic. Flowing a current through a magnetic field imparts a mechanical force on a structure carrying the current. If the current and mechanical force are near the mechanical resonant frequency of the structure, the conductive path will exhibit an associated resonance frequency characteristic.

Support beams 108a, 108b may be excited, for example by an impulse of current from a current source (not shown) included in or coupled to detector logic 155, such that they have a resulting resonance frequency. For example, support beams 108a, 108b may carry a current for a period of time on the order of a few to tens of milliseconds—e.g. approximately 5 ms to 20 ms. After such excitation of support beams 108a, 108b, detector logic 155 may detect resonance characteristics of support beams 108a, 108b for a few hundred microseconds. In an embodiment, a phase locked loop (PLL) or other such circuitry of detector logic 155 measures a frequency of vibration of support beams 108a, 108b.

In an embodiment, detector logic 155 may switch between exciting one or more support beams and measuring resonance of such one or more support beams. For example, detector logic 155 may include switch circuitry to selectively activate any of a variety of combinations of support arms for excitation and/or resonance measurement—e.g. including periodically sampling resonance frequency at intervals. Particular mechanisms for such switching among support beam excitation and/or sampling are not limiting on certain embodiments.

A change in such resonance frequency can be correlated to a magnitude of acceleration. In practice and depending on the application, change in resonance frequency can be used directly as a value for acceleration, or a correlation can be set up—e.g. either using a look up table, or any other appropriate calibration technique. As will be appreciated, the specific change in frequency will depend on the structural features of system 100, including the beam width, thickness, length and material, and proof mass weight as well as the measured acceleration.

In operation, as proof mass 102 undergoes acceleration—e.g. due to motion of a device in which accelerometer 150 is embedded—the resonance frequency of the conductive path will change. For example, in the configuration shown for support beams 108a, 108b, resonance frequency tends to change linearly with acceleration along the X dimension. However, since X-dimension acceleration tends to produce tension in one of support beams 108a, 108b and compression in the other of support beams 108a, 108b, the effect is relatively smaller compared to acceleration along the Y dimension (or the Z dimension).

By contrast, as proof mass 102 is accelerated along the Y dimension (or the Z dimension), a tension will be induced in both support beams 108a, 108b, changing their elastic behavior. Consequently, accelerometer 150 is more sensitive to Y-dimension and/or Z-dimension acceleration, as compared to X-dimension acceleration. However, due to the configuration of accelerometer 150, the resonance frequency tends to change non-linearly with such Y-dimension and/or Z-dimension acceleration.

To address non-linear sensitivity to certain types of acceleration, accelerometer 150 further includes a plurality of wires each coupled to the proof mass and flexibly coupled to a respective anchor, the plurality of wires to facilitate a biasing of proof mass 102. By way of illustration and not limitation, accelerometer 150 may include bias wire 118a coupled to proof mass 102 and flexibly coupled to an anchor 120b. Additionally or alternatively, accelerometer 150 may include bias wire 118b coupled to proof mass 102 and flexibly coupled to an anchor 120b. Bias wires 118a, 118b may each be suspended above magnet 112—e.g. where bias wires 118a, 118b each extend over a face of magnet 112 and/or are each offset toward a respective pole of magnet 112. A side view of such a configuration is illustrated in FIG. 1B. Flexible connection of bias wires 118a, 118b to anchors 120a, 120b, respectively, may be with one or more spring structures (variously represented by shading), for example. Any of a variety of additional or alternative bias wires may provide for biasing of accelerometer 150, according to different embodiments.

Anchors 120a, 120b, may provide electrical connectivity for bias wires 118a, 118b—e.g. in addition to providing mechanical support for suspending bias wires 118a, 118b over magnet 112. By way of illustration and not limitation, bias wires 118a, 118b may provide at least part of a conductive path for an electrical signal—e.g. a direct current signal or a square, triangular or other periodic wave signal—to be exchanged between anchors 120a, 120b. In an embodiment, the electrical signal exchanged between anchors 120a, 120b traverses the magnetic field generated by magnet 112—e.g. at least in part along X dimension. The electrical signal may further be conducted via proof mass 102, although certain embodiments are not limited in this regard. Interactions between a current carried by bias wires 118a, 118b and a magnetic field generated by magnet 112 may result in bias wires 118a, 118b exerting a force on proof mass 102—e.g. where the force is along the Y dimension.

FIG. 2A is a top view illustrating elements of an accelerometer 200 according to an embodiment. Accelerometer 200 may be operable to provide some or all of the functionality of accelerometer 150, for example.

In an embodiment, accelerometer 200 includes magnets 220, 225—e.g. permanent magnets—a proof mass 210 that acts as the inertial mass, and support beams 230, 232, 234, 236 which contribute to suspension of proof mass 210 over a level which includes magnets 220, 225. By way of illustration and not limitation, support beams 230, 232, 234, 236 may each couple to proof mass 210 independent of one another, where support beams 230, 232, 234, 236 are further coupled, respectively, to anchors 240, 242, 244, 246 of accelerometer 200. Accelerometer 200 may include any of a variety of additional or alternative support structures for suspending proof mass 210, according to different embodiments.

Anchors 240, 242, 244, 246, may provide electrical connectivity for support beams 230, 232, 234, 236, respectively—e.g. in addition to providing mechanical support for suspending proof mass 210. A side view of such a configuration is illustrated in FIG. 2B. In an embodiment, various pairs of support beams 230, 232, 234, 236 each provide, at least in part, a respective conductive path. By way of illustration and not limitation, support beams 230, 232 may contribute to a conductive path for a first signal to be exchanged between anchors 240, 242. Alternatively or in addition, support beams 234, 236 may contribute to another conductive path for a second signal to be exchanged between anchors 244, 246. Based on such signals, resonance frequency analysis of some or all of the conductive paths may be performed—e.g. by detector logic 150 or similar means—to evaluate an acceleration experienced by proof mass 210.

As discussed herein with reference to accelerator 150, accelerator 200 may exhibit non-linear sensitivity to acceleration in a particular direction or directions—e.g. including a direction along the Y dimension shown. To address such non-linearity, accelerometer 200 may further include bias wires 250, 252, 254, 256 each coupled to proof mass 210 independent of one another, where bias wires 250, 252, 254, 256 are further flexibly coupled to anchors 260, 262, 264, 266, respectively. Bias wires 250, 252, 254, 256 may each be suspended above magnet 112—e.g. where one or more of bias wires 250, 252, 254, 256 are offset along the Y dimension from an X dimension midline of accelerometer 200. Such an offset may, for example, be greater than a corresponding offset for an associated one of support beams 230, 232, 234, 236.

Flexible connection structures 270, 272, 274, 276 for bias wires 250, 252, 254, 256 may each include one or more spring structures such as coils and/or corrugations, for example. The flexible connection structures 270, 272, 274, 276 may allow bias wires 250, 252, 254, 256 to move with proof mass 210 while reducing loss of acceleration sensitivity by accelerometer 200—e.g. while anchors 260, 262, 264, 266 provide electrical connectivity for bias wires 250, 252, 254, 256, respectively. By way of illustration and not limitation, bias wires 250, 252 may provide at least part of a conductive path for an electrical signal to be exchanged between anchors 260, 262, and/or bias wires 254, 256 may provide at least part of a conductive path for another electrical signal to be exchanged between anchors 264, 266.

In an embodiment, an electrical signal exchanged between anchors 260, 262 traverses a magnetic field generated by magnet 220—e.g. including the signal traversing such a magnetic field at least in part along the X dimension. Alternatively or in addition, an electrical signal exchanged between anchors 264, 266 may similarly traverse a magnetic field generated by magnet 225. Some or all electrical signals variously exchanged among anchors 260, 262, 264, 266 may further be conducted via proof mass 210, although certain embodiments are not limited in this regard. In an embodiment, electromagnetic interactions between a respective currents carried by bias wires 250, 252, 254, 256 and one or both of the respective magnetic fields generated by magnets 220, 225 may result in bias wires 250, 252, 254, 256 exerting a force on proof mass 210—e.g. where the force is along the Y dimension.

Arrows included in FIG. 2A represent the direction of signals variously carried by support beams 230, 232, 234, 236 and bias wires 250, 252, 254, 256 according to an embodiment where magnets 220, 225 have the same respective polarities—e.g. North polarities—similarly oriented along the Z dimension shown. In an embodiment, bias wires 250, 252, 254, 256 each carry a respective direct current (or alternatively, a square, triangular or other periodic wave) signal, where the arrows for bias wires 250, 252, 254, 256 each represent a relationship between such signals—e.g. including representing relative directions of current flow in bias wires 250, 252, 254, 256 at some arbitrary point in time. Alternatively or in addition, support beams 230, 232, 234, 236 may each carry a respective alternating current signal or other time varying signal, where the arrows for support beams 230, 232, 234, 236 represent a phase relationship between such alternating current signals—e.g. including representing relative directions of current flow in support beams 230, 232, 234, 236 at an arbitrary point in time.

In an embodiment where all bias wires have the same geometry and conduct a similar current level, proof mass 210 may be subjected to a resulting force may have a magnitude F represented by the following equation:

$$F = N(iL \times B) \quad (1)$$

where N is a total number of bias wires, L is a length of each bias wire, i is a current carried by each bias wire and B is a magnetic flux density at each such bias wire.

FIG. 2B is a side view of accelerometer 200, illustrating the profile of the magnets 220, 225 and their relationship with support beams 232, 236 (support beams 230, 234 not being visible in this view). As will be appreciated, the distances illustrated and thicknesses are not necessarily to scale. In embodiments, magnets 220, 225 may be between approximately 100-300 μm thick, and between about 100 and 1000 μm in the X and Y dimensions. As an example, they may be made from a samarium-cobalt alloy. Neodymium iron boron magnets may similarly find application in embodiments. Typical magnetic field strengths may be in the range of 0.1-0.4 T.

In an embodiment, the beams are on the order of about 2 and 20 μm thick, 4-30 μm wide and 200-2000 μm long. The proof mass may be in the range of 20-400 μg. The distance between a magnet and an overlying beam may be between about 5 and 50 μm. Driving currents for the circuit may be in the range of 1-20 mA. As will be appreciated, these dimensions may be varied, and the resulting characteristic vibration frequency will depend on the particular design choices.

FIG. 3 is a top view illustrating elements of an accelerometer 300 according to an embodiment. Accelerometer 300 may be operable to provide some or all of the functionality of accelerometer 150, for example.

In an embodiment, certain components of accelerometer 300 are arranged in a configuration similar to that for corresponding components of accelerometer 200. For example, accelerometer 300 may include magnets 320, 325, proof mass 310 and support beams 330, 332, 334, 336 which correspond functionally to magnets 220, 225, proof mass 210 and support beams 230, 232, 234, 236, respectively. Accelerometer 300 may further include anchors 340, 342, 344, 346 which correspond functionally to anchors 240, 242, 244, 246, respectively As discussed herein with reference to accelerator 150, accelerator 300 may exhibit non-linear sensitivity to acceleration in a particular direction or directions—e.g. including a direction along the Y dimension shown. To address such non-linearity, accelerometer 300 may further include bias wires 350, 352, 354, 356, anchors 360, 362, 364, 366 and flexible connection structures 370, 372, 374, 376, which correspond functionally to bias wires 250, 252, 254, 256, anchors 260, 262, 264, 266 and flexible connection structures 270, 272, 274, 276, respectively.

As compared to accelerometer 200, accelerometer 300 represents an alternative arrangement of magnetic polarity and electrical signaling to achieve proof mass biasing similar to that provided for proof mass 210. Arrows included in FIG. 3 represent the direction of current variously carried by support beams 330, 332, 334, 336 and bias wires 350, 352, 354, 356 for an embodiment in which magnets 320, 325 are both configured to have opposite alignments of their respective magnetic axes each along the Y dimension shown. In an embodiment, bias wires 350, 352, 354, 356 each carry a respective direct current (or alternatively, a square, triangular or other periodic wave) signal, where the arrows for bias wires 350, 352, 354, 356 each represent a respective direction of current flow at some arbitrary point in time. Alternatively or in addition, support beams 330, 332, 334, 336 may each carry a respective alternating current signal or other time varying signal, where the arrows for support beams 330, 332, 334, 336 represent a phase relationship between such alternating current signals—e.g. including representing relative directions of current flow in support beams 330, 332, 334, 336 at an arbitrary point in time.

Figure 4:
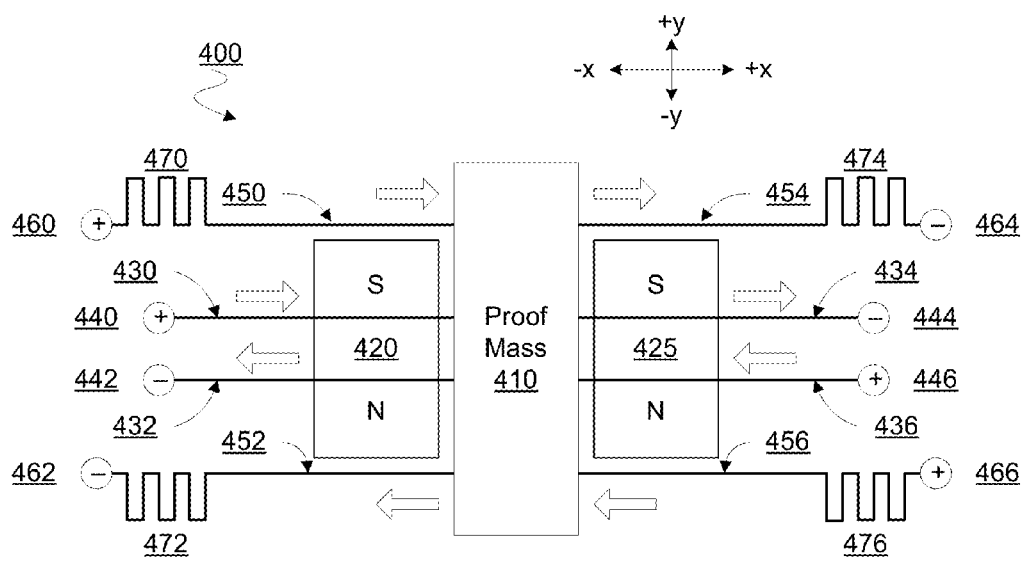
FIG. 4 is a block diagram illustrating elements of an accelerometer according to an embodiment.

FIG. 4 is a top view illustrating elements of an accelerometer 400 according to an embodiment, where certain components of accelerometer 400 are arranged in a configuration similar to that for corresponding components of accelerometer 200.

Accelerometer 400 may include magnets (not shown), proof mass 410 and support beams 430, 432, 434, 436 coupled thereto, and anchors 440, 442, 444, 446 coupled to support beams 430, 432, 434, 436, respectively. To provide biasing of proof mass 410, accelerometer 400 further includes bias wires 450, 452, 454, 456, anchors 460, 462, 464, 466 and flexible connection structures 470, 472, 474, 476, which correspond functionally to bias wires 250, 252, 254, 256, anchors 260, 262, 264, 266 and flexible connection structures 270, 272, 274, 276, respectively.

As compared to accelerometer 200, accelerometer 400 represents an alternative arrangement of magnetic polarity and electrical signaling to achieve proof mass biasing similar to that provided for proof mass 210. Arrows included in FIG. 4 represent the direction of current variously carried by support beams 430, 432, 434, 436 and bias wires 450, 452, 454, 456 for an embodiment in which magnets 420, 425 are both configured to have the same alignment of their respective magnetic axes each along the Y dimension shown. In an embodiment, bias wires 450, 452, 454, 456 each carry a respective direct current (or alternatively, a square, triangular or other periodic wave) signal, where the arrows for bias wires 450, 452, 454, 456 each represent a respective direction of current flow at some arbitrary point in time. Alternatively or in addition, support beams 430, 432, 434, 436 may each carry a respective alternating current signal or other time varying signal, where the arrows for support beams 430, 432, 434, 436 represent a phase relationship between such alternating current signals—e.g. including representing relative directions of current flow in support beams 430, 432, 434, 436 at an arbitrary point in time.

Figure 5:
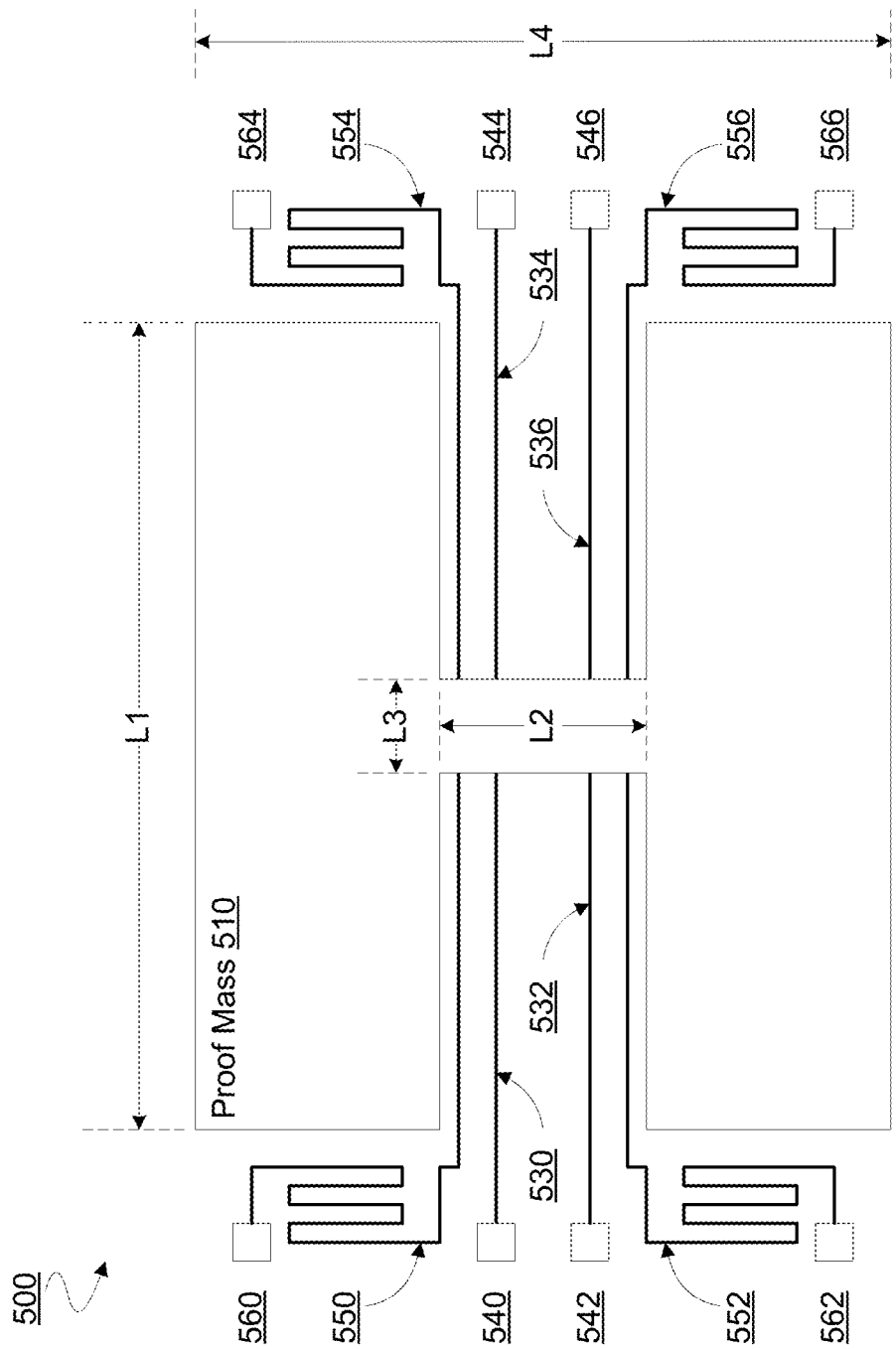
FIG. 5 is a block diagram illustrating elements of an accelerometer according to an embodiment.

FIG. 5 is a top view illustrating elements of an accelerometer 500 according to an embodiment, where certain components of accelerometer 500 are arranged in a configuration similar to that for corresponding components of accelerometer 200. Accelerometer 500 may include magnets (not shown), proof mass 510 and support beams 530, 532, 534, 536 coupled thereto, and anchors 540, 542, 544, 546 coupled to support beams 530, 532, 534, 536, respectively. To provide biasing of proof mass 510, accelerometer 500 further includes bias wires 550, 552, 554, 556 coupled to proof mass 510 and further flexibly coupled, respectively, to anchors 560, 562, 564, 566 of accelerometer 500.

In an illustrative embodiment of accelerometer 500, proof mass 510 may have an "I" profile with an overall width L1, an overall height L4 and a neck portion having a width L2 and a height L3. By way of illustration and not limitation, L1, L2, L3 and L4 may be on the order of 3300 μm, 700 μm, 300 μm and 1790 μm, respectively—e.g. where the length of each support beam 530, 532, 534, 536 is on the order of 1000 μm to 1500 μm.

In such an embodiment, a baseline support beam resonance frequency for 0 G acceleration of accelerometer 500 may be on the order of 16000 Hz, for example. Additionally or alternatively, the sensitivity of such resonance frequency to acceleration may be on the order of 0.18 Hz/m/s2 when accelerometer 500 is under 0.1 G acceleration. This sensitivity may change with additional acceleration of accelerometer 500, e.g. where the sensitivity is on the order of 1.7 Hz/m/s2 when accelerometer 500 is under 1 G acceleration and on the order of 7 Hz/m/s2 when accelerometer 500 is under 2 G acceleration.

In an embodiment, a bias current on the order of 14 mA may provide a bias of 1 G for proof mass 510. Alternatively or in addition, a bias current on the order of 28 mA may provide a bias of 2 G and/or a bias current on the order of 100 mA may provide a bias of 8 G. The above-described operation characteristics are merely illustrative of one embodiment, and may vary between embodiments according to implementation-specific geometries and/or configurations of elements.

FIGS. 6A through 6I illustrate elements of a process for manufacturing an accelerometer in accordance with an embodiment. In principle, the illustrated layering may be varied. For example, additional layers may be interspersed, containing dielectrics, functional layers, or other components for other microelectronic devices present on the common substrate. Likewise, certain of the illustrated layers (for example layers underlying the accelerometer components) may or may not be present in a device that is nonetheless in accordance with embodiments.

FIG. 6A shows a substrate 602 on which the device is supported, which may be a copper plate or other substrate including, without limitation, glass or organic material. For use in bumpless build up layer (BBUL) applications, any substrate suitable for use in that technology may be used. A thin metal layer 604 overlies the substrate 602. A dielectric adhesive layer 606 is formed over the layer 604. A thin substrate layer 608 is optionally placed over the dielectric layer 606. This layer can provide a relatively rigid substrate for the magnet 610, but is not necessarily required. The magnet 610 is pick placed onto the adhesive layer 606. Similarly, a die 612 is optionally pick placed in the adhesive proximate the magnet 610. This die 612 may include control and/or detector circuitry such as the current source, switch, phase locked loop, differential amplifier and/or other related circuitry for controlling and interrogating the accelerometer. As will be appreciated, the die 612 may include all or none of these circuits, and may include other circuits for performing other functions.

It will be appreciated that, in a system on a chip embodiment, the die 612 may include a processor, memory, communications circuitry and the like. Though a single die 612 is illustrated, there may be none, one or several dies included in the same region of the wafer.

A dielectric layer 614 is deposited over the magnet 610 and die 612 as illustrated in FIG. 6B, by lamination of a dry film, for example and may be substantially planarized by compression. This layer 614 may be, for example, an organic dielectric film. Over the dielectric layer 614, one or more conductive layers, represented by an illustrative conducting trace layer 616, is deposited. In an embodiment, the one or more conductive layers represented by trace layer 616 will embody some or all of a proof mass, support beams, bias wires, flexible connection structures (for coupling respective bias wires each to a respective anchor/electrical connection) and other conductive elements of the device. As will be appreciated, this layer will generally be a metallic layer, but may be any conducting material. It may be sputtered or plated using a semi-additive process, for example. Via holes 618 may be drilled or otherwise fabricated in the trace layer 616 as shown in FIG. 6C.

An additional dielectric layer 620 is laminated over the trace layer 616, as shown in FIG. 6D, similarly to layer 614. A metal layer 622, including, for example, a plate protection mesh 624 and electrical contacts 626 is deposited over the dielectric layer 620 (FIG. 6E). Generally, the plate protection mesh should be anchored to underlying structures at several locations (not shown) not occupied by the accelerometer structure.

A layer of photoresist 628 is applied, for example by spin coating (FIG. 6F). A region 630 overlying the accelerometer structure is either kept clear of photoresist, or that portion of the photoresist is removed, providing access to the mesh 624 and the accelerometer structure, while the remainder of the wafer is protected.

Portions of the nonfunctional dielectric layers 614 and 620 are etched or otherwise processed to remove them such that support beams, bias wires and proof mass may freely vibrate as described above (FIG. 6G). In an embodiment, an oxygen plasma method is used, though other approaches to material removal may be used.

The photoresist layer 628 is removed, for example by a resist stripping process. A wet chemical process may be used, or alternately, a dry process such as a plasma stripping process may be used (FIG. 6H). The resulting package is then re-covered with another laminate organic layer (or other suitable dielectric layer) 632, completing the packaging (FIG. 6I). In this operation, the plate protection mesh 624 protects and separates the active portions of the accelerometer from the laminate layer. Subsequently, the copper substrate 602 may be removed (not shown).

Figure 7:
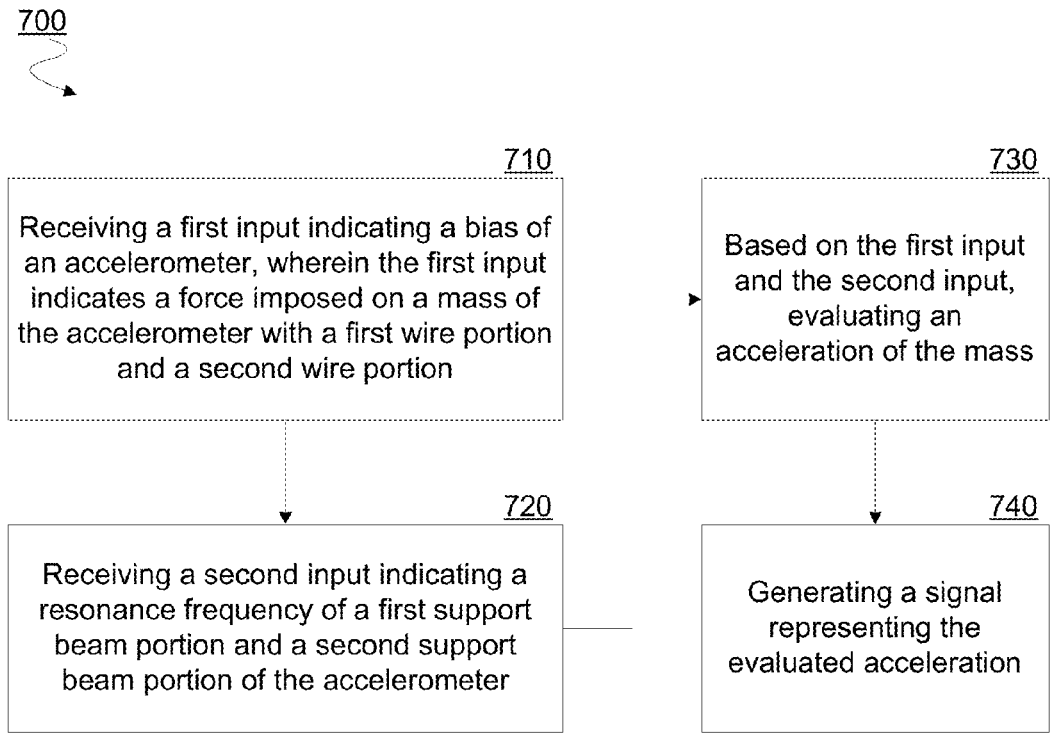
FIG. 7 is a flow diagram illustrating elements of a method for metering acceleration according to an embodiment.

FIG. 7 illustrates elements of a method 700 for metering an acceleration according to an embodiment. Method 700 may be performed with, or based on, operation of an accelerometer including some or all of the features of accelerometer 150, for example. In an embodiment, method 500 is performed by circuitry including some or all of the functionality of detector logic 155.

In an embodiment, method 700 includes, at 710, receiving a first input indicating a bias of the accelerometer. The first input may specify or otherwise indicate a force imposed on a mass of the accelerometer—e.g. the proof mass—by a first wire portion and a second wire portion of the accelerometer. Such a force may be imposed, for example, by electromagnetic interactions between a magnet of the accelerometer and a signal conducted with the first wire portion and the second wire portion.

In an embodiment, the first input received at 710 includes the signal conducted with the first wire portion and the second wire portion. Alternatively, the first input may include information which specifies one or more characteristics—e.g. including an amperage—of such a signal. Alternatively or in addition, the first input may include information specifying one or more characteristics—e.g. including a magnitude and/or a direction—of the force imposed on the mass due to such a signal.

Method 700 may further include, at 720, receiving a second input indicating a resonance frequency of a first support beam portion of the accelerator and a second support beam portion of the accelerator. In an embodiment, the mass is suspended with the first support beam portion and the second support beam portion. The resonance frequency indicated by the second input may be based on the magnetic field and a time varying signal which is conducted with the first support beam portion and the second support beam portion while the force is imposed on the mass.

In an embodiment, the second input received at 720 includes the time varying signal conducted with the first support beam portion and the second support beam portion. Alternatively, the second input may include information which specifies one or more characteristics of such a time varying signal. Alternatively or in addition, the second input may include information which specifies the resonance frequency. Detection of the resonance frequency may be performed, for example, with a PLL circuit—e.g. according to conventional techniques adapted for implementation in various embodiments.

Based on the received first input and second input, method 700 may include, at 730, evaluating an acceleration of the mass. By way of illustration and not limitation, the evaluating at 730 may include identifying one or more values which specify a magnitude and/or direction of an acceleration corresponding to the resonance frequency indicated by the second input. For example, a lookup-table or other reference information may be searched based on the second input to identify such one or more values. Such reference information may represent a sensitivity response profile for the accelerometer which, for example, is generated during initial testing and/or calibration. Certain embodiments are not limited with respect to how such reference information is made available a priori for use in method 700.

In an embodiment, the evaluating at 730 includes identifying a bias component which corresponds to the force indicated by the first input. For example, a lookup-table or other reference information may be searched based on the first input to identify one or more values which specify a magnitude and/or direction of the bias component. As mentioned above, certain embodiments are not limited with respect to how such reference information is made available a priori for use in method 700.

In an embodiment, method 700 includes, at 740, generating a signal representing the evaluated acceleration. The signal generated at 740 may be provided, for example, for representation of the detected acceleration to any of a variety of software and/or hardware applications—e.g. to update in a touchscreen or other video display a representation of an orientation and/or position of a device which includes the accelerometer and the video display.

The biasing of a proof mass may be supplemented with various techniques and/or mechanisms according to different embodiments. For example, differential biasing may be implemented by applying a time-varying periodic signal, such as a square (or triangular) wave signal, to a pair of bias wires which provide at least part of a conductive path. By way of illustration and not limitation, the pair of bias wires 250, 252 may successively alternate between conducting a first current level to impose a +1 G equivalent force on proof mass 210 (e.g. in the −Y direction) and conducting a second current level to impose a −1 G equivalent force on proof mass 210 (e.g. in the +Y direction). A first evaluation of beam resonance may be performed for a first system state (e.g. a first time or time period) which includes the proof mass being biased with the first current level the for +1 G equivalent force. Another evaluation of the beam resonance may be performed for a second system state (e.g. a second time or time period) which includes the proof mass being biased with the second current level for −1 G equivalent force. Given the first and second bias current levels (and/or the corresponding bias forces) and the evaluated beam resonance frequencies, a time-based differential biasing analysis may be performed to calculate direction and/or magnitude of proof mass acceleration.

Figure 9A:
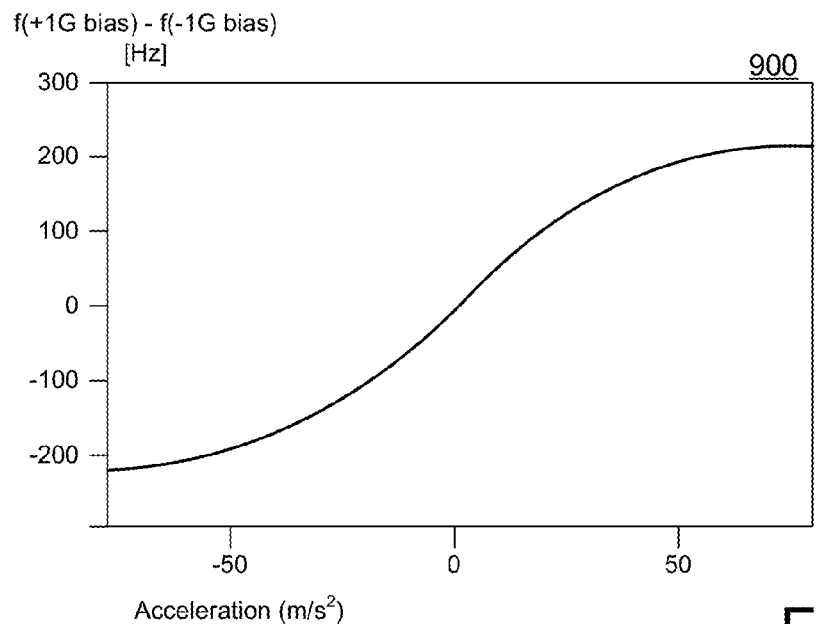
FIGS. 9A, 9B are graphs illustrating respective operating characteristics of an accelerometer according to an embodiment.

Differential biasing may be used to increase sensitivity and/or to differentiate between positive and negative acceleration. As shown in the graph 900 of FIG. 9A, at small magnitudes of acceleration, higher sensitivity to changes in such acceleration may be achieved with reference to a differential frequency $f_{diff}$ represented by the following equation:

$$f_{diff} = f(+N \text{ bias}) - f(-N \text{ bias}), \quad (2)$$

where f(+N bias) is a resonance frequency detected while a proof mass is under a +N bias force, and where f(−N bias) is a resonance frequency detected while a proof mass is under a −N bias force. In FIG. 9A, N is equal to 1 G.

Figure 9B:
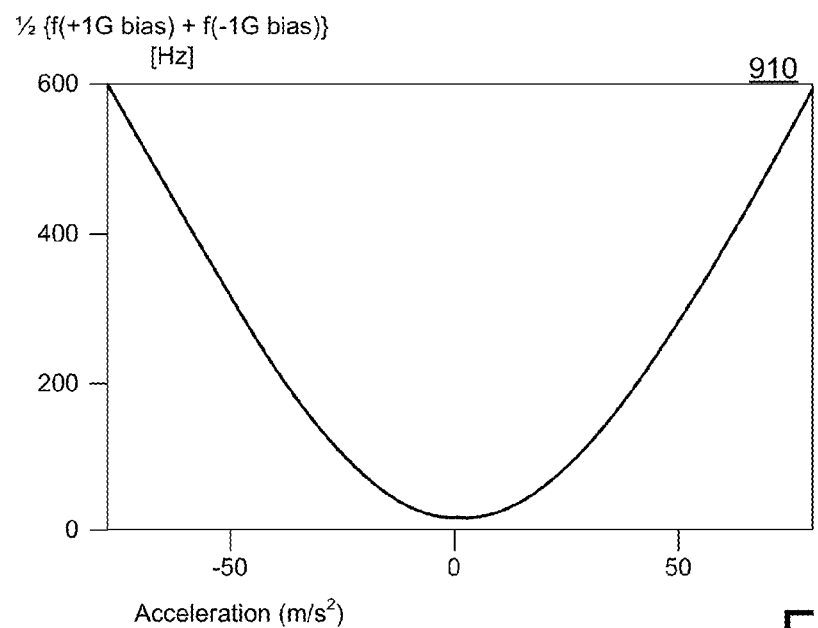

By contrast, as shown in the graph 910 of FIG. 9B, at larger magnitudes of acceleration, higher sensitivity to changes in such acceleration may be achieved with reference to an frequency $f_{avg}$ represented by the following equation:

$$f_{avg} = \tfrac{1}{2}\{f(+N \text{ bias}) - f(-N \text{ bias})\}. \quad (3)$$

Certain embodiments may select from a differential resonance frequency such as $f_{diff}$ and an average resonance such as $f_{avg}$—e.g. to choose a particular equation to apply for an evaluating at 730. In an embodiment, such selecting may be based on one or more test conditions—e.g. including a comparison of one or more of f(+N bias), f(−N bias), $f_{diff}$ and $f_{avg}$ each to a respective threshold value. By way of illustration and not limitation, $f_{diff}$ may be used to determine direction and magnitude of acceleration if such one or more test conditions indicate that acceleration is greater than or equal to some threshold level—e.g. 1 G. Alternatively, if such one or more test conditions indicate that acceleration is less than such a threshold level, $f_{\mathit{diff}}$ may be used to determine direction of acceleration, and $f_{avg}$ may be used to determine magnitude of acceleration.

Figure 8:
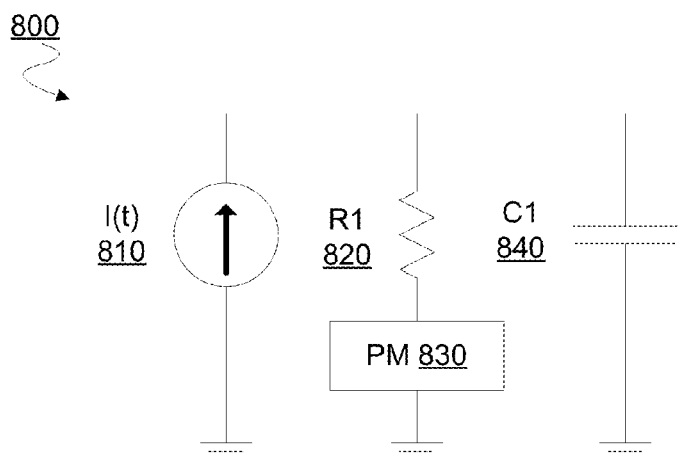
FIG. 8 is a circuit diagram illustrating elements of an accelerometer according to an embodiment.

FIG. 8 illustrates elements of an RC delay circuit 800 for reducing ringing caused by proof mass biasing according to an embodiment. RC delay circuit 800 may be implemented for an accelerometer including some or all of the features of accelerometer 150, for example. RC delay circuit 800 includes a current source I(t) 810 which, for example, alternates between different levels of DC current to be conducted at least in part with a proof mass PM 830 of an accelerator—e.g. proof mass 102, proof mass 210 or the like. Ringing may also be reduced by providing a ramped signal (such as a triangular wave) with current source I(t) 810.

In an embodiment, PM 830 may have an overly high Q factor for its intended use as an inertial mass of the accelerometer. Accordingly, PM 830 may be prone to ringing when there is a large step change in biasing of PM 830. To reduce such ringing, RC delay circuit 800 includes a resistor R1 820 and a capacitor C1 840 in parallel with one another—e.g. where the circuit leg comprising PM 820 and R1 820 includes a pair of bias wires. By way of illustration and not limitation, R1 820 may have a resistance of 0.1-10Ω and a capacitor C1 840 may have a capacitance 1 nF to 100 uF. With such impedance, RC delay circuit 800 may smooth out step changes in biasing of PM 830 to reduce ringing thereof—e.g. during differential biasing.

Figure 10:
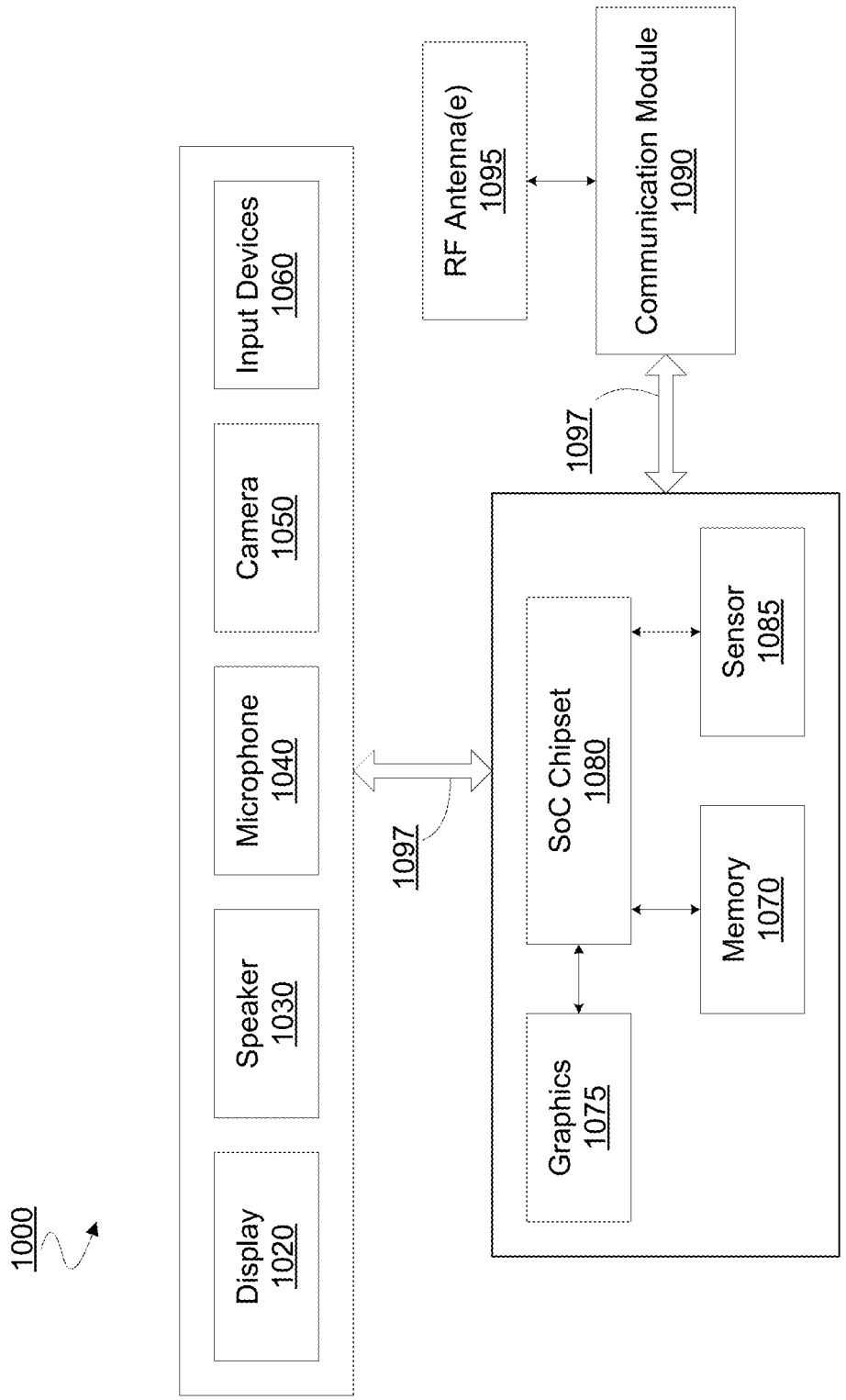
FIG. 10 is a block diagram illustrating elements of a computing system for metering acceleration according to an embodiment.

FIG. 10 illustrates elements of a generic device or system 100 within, or in association with, which one or more embodiments may be implemented. In some embodiments, the generic device or system 1000 illustrated in FIG. 10 may comprise a portable or hand-held electronic and/or computing device. Such electronic and/or computing devices may include laptops, mobile devices, smartphones, gaming devices, tablet computers, networking devices, and/or other devices. In the illustrative example, device or system 1000 includes a display device 1020, a speaker 1030, a microphone 1040, a camera 1050, input devices 1060, a memory 1070, graphics processor 1075, a system-on-chip (SoC) chipset 1080, an accelerometer 1085 in accordance with various of the foregoing embodiments, a communication module 1090, and an antenna 1095. Device 1000 may also include a bus 1097 and/or other interconnection means to connect and communicate information between various components of device 1000.

In some embodiments, display device 1020 is configured to display information to a user and may comprise a liquid crystal display (LCD), a light emitting diode (LED)-based display, or any other flat panel display, or may use a cathode ray tube (CRT). Speaker 1030, microphone 1040 and camera 1050 are configured to create, capture, and output audio and visual content, which may be processed by one or more processors (e.g., within SoC 1080) and stored in a storage device associated with device 1000. Input devices 1060 may include alphanumeric and other keys which may be inputted via a keyboard, touch screen or other comparable input mechanism. Microphone 1040 and camera 1050 may be configured to receive input (information, command selections, etc.) from a user or another associated device or system. The input information received through one or more input devices 1060 may be communicated to a processor of SoC 1080, e.g., via bus 1097, for further processing. Another type of input device 1060 may include a cursor control device, such as a mouse, a trackball, or cursor direction keys to communicate direction information and command selections, e.g., to SoC 1080 and to control cursor movement on display device 1020.

Memory 1070 of device 1000 may be a dynamic storage device coupled to bus 1097, and configured to store information and instructions to be executed by processors of SoC 1080 and/or other processors (or computing units) associated with device 1000. Memory 1070 may also be used to store temporary variables or other intermediate information during execution of instructions by the processors. Some or all of memory 1070 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM1, synchronous DRAM (SDRAM), JEDECSRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Device 1000 may also include read only memory (ROM) and/or other such static storage—e.g. coupled to bus 1097 and configured to store static information and instructions for processors of SoC 1080 and/or other processors (or computing units) associated with device 1000. Such data storage device of device 1000 may include a magnetic disk, optical disc or flash memory devices, and may be coupled to bus 1097 to store information and instructions.

In some embodiments, SoC 1080 is part of a core processing or computing unit of device 1000, and is configured to receive and process input data and instructions, provide output and/or control other components of device 1000 in accordance with embodiments. SoC 1080 may include a microprocessor, a memory controller, a memory and peripheral components. The microprocessor may further include a cache memory (e.g., SRAM, which along with the memory of SoC 1080 may be part of a memory hierarchy to store instructions and data. The microprocessor may also include one or more logic modules such as a field programmable gate array (FPGA) or other logic array. Communication between a microprocessor of the SoC 1080 and memory may be facilitated by the memory controller (or chipset), which may also facilitate in communicating with the peripheral components, such as counter-timers, real-time timers and power-on reset generators. SoC 1080 may also include other components including, but not limited to, timing sources (e.g., oscillators and phase-locked loops), voltage regulators, and power management circuits.

In some embodiments, device 1000 is configured to communicate with other devices or systems directly or via one or more networks using communication module 1090. Communication module 1090 may include necessary and typical hardware, software and/or firmware modules, e.g., related to a modulator, a demodulator, a baseband converter, a channel codec, and/or other components, implemented therein to enable device 1000 for wireless communication. As such, communication module 1090 is able to wirelessly transmit and receive data and messages in form of radio frequency (RF) Signals through one or more antennae 1095. In some embodiments, communication module 1090 is designed and configured to support communication based on one or more communication standards and protocols including, but not limited to, Wi-Fi, Wi-Gi, Bluetooth, GSM, CDMA, GPRS, 3 G or 4 G (e.g., WiMAX, LTE) cellular standards, Wireless USB, satellite communication, and Wireless LAN. Additionally, or alternatively, communication module 1090 may also be configured for wired communication, e.g., based on the Ethernet standard, and as such, may be coupled to an appropriate network interface of device 1000.

In one aspect, an apparatus comprises a microelectromechanical accelerometer including a mass, a first magnet to generate a magnetic field, and a first support beam portion and a second support beam portion each to conduct a time varying signal which traverses the magnetic field along a first dimension, wherein a resonance frequency for the time varying signal is based on the magnetic field, wherein the mass is suspended with the first support beam portion and the second support beam portion. The microelectromechanical accelerometer further comprises a first wire portion coupled to the mass and flexibly coupled to a first anchor, and a second wire portion coupled to the mass and flexibly coupled to a second anchor, wherein the first anchor and the second anchor to exchange a first signal with the first wire portion and the second wire portion, wherein, based on the first signal and the magnetic field, the first wire portion and the second wire portion to impose a force on the mass along a second dimension perpendicular to the first dimension.

In an embodiment, the first signal includes a direct current signal. In another embodiment, the first wire portion is flexibly coupled to the first anchor via a spring structure. In another embodiment, the spring structure includes coils or corrugations. In another embodiment, the apparatus further comprises detector logic to receive a first input indicating a bias of the microelectromechanical accelerometer, wherein the first input indicates the force, to receive a second input indicating the resonance frequency, to evaluate an acceleration of the mass based on the first input and the second input, and to generate a signal representing the evaluated acceleration.

In another embodiment, the first signal includes a periodic wave signal, wherein the detector logic to evaluate the acceleration based on the first input and the second input includes the detector logic to evaluate one of a differential resonance frequency and an average resonance frequency. In another embodiment, the detector logic is further to select between the differential resonance frequency and the average resonance frequency for evaluation of the acceleration, wherein the detector logic to select based on the first input and the second input. In another embodiment, the microelectromechanical accelerometer further comprises a second magnet, a third support beam portion and a fourth support beam portion, a third wire portion coupled to the mass and flexibly coupled to a third anchor, and a fourth wire portion coupled to the mass and flexibly coupled to a fourth anchor. In another embodiment, the apparatus further comprises a delay circuit including a resistor and a capacitor coupled to the proof mass, the delay circuit to reduce a ringing of the proof mass.

In another aspect, a system comprises a microelectromechanical accelerometer including a mass, a first magnet to generate a magnetic field, and a first support beam portion and a second support beam portion each to conduct a time varying signal which traverses the magnetic field along a first dimension, wherein a resonance frequency for the time varying signal is based on the magnetic field, wherein the mass is suspended with the first support beam portion and the second support beam portion. The microelectromechanical accelerometer further comprises a first wire portion coupled to the mass and flexibly coupled to a first anchor and a second wire portion coupled to the mass and flexibly coupled to a second anchor, wherein the first anchor and the second anchor to exchange a first signal with the first wire portion and the second wire portion, wherein, based on the first signal and the magnetic field, the first wire portion and the second wire portion to impose a force on the mass along a second dimension perpendicular to the first dimension. The system further comprises a touchscreen display device coupled to the microelectromechanical accelerometer, the touchscreen display device to provide in a user display information indicating an acceleration of the proof mass.

In an embodiment, the first signal includes a direct current signal. In another embodiment, the first wire portion is flexibly coupled to the first anchor via a spring structure. In another embodiment, the spring structure includes coils or corrugations. In another embodiment, the microelectromechanical accelerometer further comprises detector logic to receive a first input indicating a bias of the microelectromechanical accelerometer, wherein the first input indicates the force, to receive a second input indicating the resonance frequency, to evaluate an acceleration of the mass based on the first input and the second input, and to generate a signal representing the evaluated acceleration.

In another embodiment, the first signal includes a periodic wave signal, wherein the detector logic to evaluate the acceleration based on the first input and the second input includes the detector logic to evaluate one of a differential resonance frequency and an average resonance frequency. In another embodiment, the detector logic is further to select between the differential resonance frequency and the average resonance frequency for evaluation of the acceleration, wherein the detector logic to select based on the first input and the second input. In another embodiment, the microelectromechanical accelerometer further comprises a second magnet, a third support beam portion and a fourth support beam portion, a third wire portion coupled to the mass and flexibly coupled to a third anchor, and a fourth wire portion coupled to the mass and flexibly coupled to a fourth anchor. In another embodiment, the microelectromechanical accelerometer further comprises a delay circuit including a resistor and a capacitor coupled to the proof mass, the delay circuit to reduce a ringing of the proof mass.

In another aspect, a method of manufacturing a microelectromechanical accelerometer comprises placing a first magnet on a substrate, laminating a first dielectric layer over the first magnet, and forming one or more conductive layers over the first dielectric layer. The one or more conductive layers include a mass, a first support beam portion and a second support beam portion, a first wire portion coupled to the mass and flexibly coupled to a first anchor and a second wire portion coupled to the mass and flexibly coupled to a second anchor. The method further comprises removing a portion of the first dielectric layer proximate to each of the mass, the first support beam portion, the second support beam, the first wire portion and the second wire portion, wherein after the portion of the first dielectric layer is removed, the mass is suspended by the first support beam and the second support beam and movable in response to acceleration of the microelectromechanical accelerometer.

In an embodiment, the first wire portion is flexibly coupled to the first anchor via a spring structure. In another embodiment, the spring structure includes coils or corrugations. In another embodiment, the method further comprises placing on the substrate a die including detector logic to receive a first input indicating a bias of the microelectromechanical accelerometer, wherein the first input indicates the force, to receive a second input indicating the resonance frequency, to evaluate an acceleration of the mass based on the first input and the second input, and to generate a signal representing the evaluated acceleration. In another embodiment, the apparatus further comprises placing a second magnet on the substrate, wherein the one or more conductive layers further include a third support beam portion and a fourth support beam portion, a third wire portion coupled to the mass and flexibly coupled to a third anchor, and a fourth wire portion coupled to the mass and flexibly coupled to a fourth anchor.

In another aspect, a method comprises receiving a first input indicating a bias of an accelerometer including a first magnet, a mass, a first support beam portion, a second support beam portion, a first wire portion coupled to the mass and flexibly coupled to a first anchor, and a second wire portion coupled to the mass and flexibly coupled to a second anchor, wherein the mass is suspended with the first support beam portion and the second support beam portion, wherein the first anchor and the second anchor exchange a first signal, and wherein, based on the first signal and a magnetic field of the magnet, the first wire portion and the second wire portion to impose a force on the mass, wherein the first input indicates the force. The method further comprises receiving a second input indicating a resonance frequency of the first support beam portion and the second support beam portion, the resonance frequency based on the magnetic field and time varying signal conducted with the first support beam portion and the second support beam portion while the force is imposed on the mass. The method further comprises, based on the first input and the second input, evaluating an acceleration of the mass, and generating a signal representing the evaluated acceleration.

In an embodiment, the first signal includes a direct current signal. In another embodiment, the first wire portion is flexibly coupled to the first anchor via a spring structure. In another embodiment, the spring structure includes coils or corrugations. In another embodiment, the first signal includes a periodic wave signal, wherein evaluating the acceleration based on the first input and the second input includes evaluating one of a differential resonance frequency and an average resonance frequency. In another embodiment, the method further comprises, based on the first input and the second input, selecting between the differential resonance frequency and the average resonance frequency for evaluation of the acceleration. In another embodiment, selecting between the differential resonance frequency and the average resonance frequency includes, if the first input and the second input indicate that the acceleration is greater than or equal a threshold level, then selecting the differential resonance frequency for determining a direction and a magnitude of the acceleration, else selecting the differential resonance frequency for determining the direction of the acceleration and selecting the average resonance frequency for determining the magnitude of acceleration.

Techniques and architectures for providing acceleration metering are described herein. Accelerometers as described herein may be manufactured as part of a chip scale packaging approach including, but not limited to, bumpless build up layer (BBUL) packaging technology. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a microelectromechanical accelerometer including:
a mass;
a first magnet to generate a magnetic field;

a first support beam portion and a second support beam portion each to conduct a time varying signal which traverses the magnetic field along a first dimension, wherein a resonance frequency for the time varying signal is based on the magnetic field, wherein the mass is suspended with the first support beam portion and the second support beam portion;

a first wire portion coupled to the mass and flexibly coupled to a first anchor; and a second wire portion coupled to the mass and flexibly coupled to a second anchor, wherein the first anchor and the second anchor to exchange a first signal with the first wire portion and the second wire portion, wherein, based on the first signal and the magnetic field, the first wire portion and the second wire portion to impose a force on the mass along a second dimension perpendicular to the first dimension.

2. The apparatus of claim 1, wherein the first signal includes a direct current signal.

3. The apparatus of claim 1, wherein the first wire portion is flexibly coupled to the first anchor via a spring structure.

4. The apparatus of claim 3, wherein the spring structure includes coils or corrugations.

5. The apparatus of claim 1, further comprising detector logic to receive a first input indicating a bias of the microelectromechanical accelerometer, wherein the first input indicates the force, to receive a second input indicating the resonance frequency, to evaluate an acceleration of the mass based on the first input and the second input, and to generate a signal representing the evaluated acceleration.

6. The apparatus of claim 5, wherein the first signal includes a periodic wave signal and wherein the detector logic to evaluate the acceleration based on the first input and the second input includes the detector logic to evaluate one of a differential resonance frequency and an average resonance frequency.

7. The apparatus of claim 6, wherein the detector logic further to select between the differential resonance frequency and the average resonance frequency for evaluation of the acceleration, wherein the detector logic to select based on the first input and the second input.

8. The apparatus of claim 1, the microelectromechanical accelerometer further comprising:
a second magnet;
a third support beam portion and a fourth support beam portion;
a third wire portion coupled to the mass and flexibly coupled to a third anchor; and
a fourth wire portion coupled to the mass and flexibly coupled to a fourth anchor.

9. The apparatus of claim 1, further comprising a delay circuit including a resistor and a capacitor coupled to the mass, the delay circuit to reduce a ringing of the mass.

10. A system comprising:
a microelectromechanical accelerometer including:
a mass;
a first magnet to generate a magnetic field;
a first support beam portion and a second support beam portion each to conduct a time varying signal which traverses the magnetic field along a first dimension, wherein a resonance frequency for the time varying signal is based on the magnetic field, wherein the mass is suspended with the first support beam portion and the second support beam portion;
a first wire portion coupled to the mass and flexibly coupled to a first anchor; and
a second wire portion coupled to the mass and flexibly coupled to a second anchor, wherein the first anchor and the second anchor to exchange a first signal with the first wire portion and the second wire portion, wherein, based on the first signal and the magnetic field, the first wire portion and the second wire portion to impose a force on the mass along a second dimension perpendicular to the first dimension; and
a touchscreen display device coupled to the microelectromechanical accelerometer, the touchscreen display device to provide in a user display information indicating an acceleration of the mass.

11. The system of claim 10, wherein the first signal includes a direct current signal.

12. The system of claim 10, wherein the first wire portion is flexibly coupled to the first anchor via a spring structure.

13. The system of claim 12, wherein the spring structure includes coils or corrugations.

14. The system of claim 10, the microelectromechanical accelerometer further comprising detector logic to receive a first input indicating a bias of the microelectromechanical accelerometer, wherein the first input indicates the force, to receive a second input indicating the resonance frequency, to evaluate an acceleration of the mass based on the first input and the second input, and to generate a signal representing the evaluated acceleration.

15. The system of claim 14, wherein the first signal includes a periodic wave signal and wherein the detector logic to evaluate the acceleration based on the first input and the second input includes the detector logic to evaluate one of a differential resonance frequency and an average resonance frequency.

16. The system of claim 15, wherein the detector logic further to select between the differential resonance frequency and the average resonance frequency for evaluation of the acceleration, wherein the detector logic to select based on the first input and the second input.

17. The system of claim 10, the microelectromechanical accelerometer further comprising:
a second magnet;
a third support beam portion and a fourth support beam portion;
a third wire portion coupled to the mass and flexibly coupled to a third anchor; and
a fourth wire portion coupled to the mass and flexibly coupled to a fourth anchor.

18. The system of claim 10, the microelectromechanical accelerometer further comprising a delay circuit including a resistor and a capacitor coupled to the mass, the delay circuit to reduce a ringing of the mass.

19. A method comprising:
receiving a first input indicating a bias of an accelerometer including a first magnet, a mass, a first support beam portion, a second support beam portion, a first wire portion coupled to the mass and flexibly coupled to a first anchor, and a second wire portion coupled to the mass and flexibly coupled to a second anchor, wherein the mass is suspended with the first support beam portion and the second support beam portion, wherein the first anchor and the second anchor exchange a first signal, and wherein, based on the first signal and a magnetic field of the magnet, the first wire portion and the second wire portion to impose a force on the mass, wherein the first input indicates the force;
receiving a second input indicating a resonance frequency of the first support beam portion and the second support beam portion, the resonance frequency based on the magnetic field and time varying signal conducted with the first support beam portion and the second support beam portion while the force is imposed on the mass;

based on the first input and the second input, evaluating an acceleration of the mass; and generating a signal representing the evaluated acceleration.

20. The method of claim 19, wherein the first signal includes a direct current signal.

21. The method of claim 19, wherein the first wire portion is flexibly coupled to the first anchor via a spring structure.

22. The method of claim 21, wherein the spring structure includes coils or corrugations.

23. The method of claim 19, wherein the first signal includes a periodic wave signal and wherein evaluating the acceleration based on the first input and the second input includes evaluating one of a differential resonance frequency and an average resonance frequency.

24. The method of claim 23, further comprising:

based on the first input and the second input, selecting between the differential resonance frequency and the average resonance frequency for evaluation of the acceleration.

25. The method of claim 24, wherein selecting between the differential resonance frequency and the average resonance frequency includes:

if the first input and the second input indicate that the acceleration is greater than or equal a threshold level, then selecting the differential resonance frequency for determining a direction and a magnitude of the acceleration, else selecting the differential resonance frequency for determining the direction of the acceleration and selecting the average resonance frequency for determining the magnitude of acceleration.

* * * * *